US006930409B1

United States Patent
Smith

(10) Patent No.: US 6,930,409 B1
(45) Date of Patent: Aug. 16, 2005

(54) ELECTROMECHANICAL SWITCHING DEVICE

(76) Inventor: Jerry R. Smith, 5690 W. Rowland Ave., Littleton, CO (US) 80123

( * ) Notice: Subject to any disclaimer, the term of this patent is extended or adjusted under 35 U.S.C. 154(b) by 0 days.

(21) Appl. No.: 09/202,003

(22) PCT Filed: Jul. 9, 1997

(86) PCT No.: PCT/US97/12310

§ 371 (c)(1),
(2), (4) Date: Dec. 7, 1998

(87) PCT Pub. No.: WO98/01928

PCT Pub. Date: Jan. 15, 1998

Related U.S. Application Data

(60) Provisional application No. 60/021,435, filed on Jul. 9, 1996.

(51) Int. Cl.⁷ .................................................. H02B 1/24
(52) U.S. Cl. ....................... 307/127; 320/105; 307/125; 307/116; 307/134; 307/137; 307/138
(58) Field of Search ................................. 307/116, 127, 307/134, 137, 138; 320/105

(56) References Cited

U.S. PATENT DOCUMENTS

| | | | |
|---|---|---|---|
| 4,400,658 A | * | 8/1983 | Yates .......................... 320/105 |
| 4,471,400 A | | 9/1984 | Reza |
| 4,520,419 A | | 5/1985 | Locher et al. |
| 4,607,209 A | | 8/1986 | Guim et al. |
| 4,746,853 A | | 5/1988 | Ingalls |
| 4,769,586 A | * | 9/1988 | Kazmierowicz ............ 320/105 |
| 4,857,985 A | | 8/1989 | Miller |
| 4,994,727 A | | 2/1991 | Yang |
| 5,103,155 A | | 4/1992 | Joannou |
| 5,539,610 A | | 7/1996 | Williams et al. |

* cited by examiner

Primary Examiner—Robert DeBeradinis
(74) Attorney, Agent, or Firm—Timothy J. Martin; Michael R. Henson; Rebecca A. Gegick

(57) ABSTRACT

An electromechanical switching device ensures automatic selected polarity interconnection between terminals of two power sources. A double pole double throw (DPDT) switch has three pairs of contacts. A first pair of leads connect to two pairs of contacts in a manner that reverses polarity when switched, while a second pair of leads connect to the other pair of contacts. A switch controller employs a plurality of coils in electrical communication with the two pairs of leads. The coils are arranged and configured so that, when the two pairs of leads are connected to the respective power sources, the coils cause an actuator to move the switch automatically into the correct polarity state regardless of the connections of the leads. The invention is described as a battery jumper cable and to automatically connect like terminals of a pair of batteries. The invention encompasses the method of this device.

16 Claims, 5 Drawing Sheets

ELECTROMECHANICAL SWITCHING DEVICE

RELATED APPLICATION

This application claims the benefit of U.S. Provisional Application No. 60/021,435, filed Jul. 9, 1996.

FIELD OF INVENTION

The present invention is directed to electromechanical switches for automatically providing a desired polarity connection between two sources of power. Though not by way of limitation, the present invention finds particular application in the automotive field in order to properly interconnect like terminals of a pair of vehicle batteries for recharging.

BACKGROUND OF THE INVENTION

Relays and switches are used in a variety of industrial and commercial applications where there is a need to control power. A relay may be either an electromechanical or solid-state device to control other devices connected to an output. Relays are generally associated with controlling the transmission of electric current in a circuit.

Electromechanical relays are used as switches that make or break a circuit by mechanical operation. Here, an electromagnet moves an armature when current flows through the electromagnet, and the armature acts as a switch. Where the magnetic field produced by a current-carrying coil is used to magnetize and move a plunger, the electromagnet may also be referred to as a solenoid.

It is known to employ either electromechanical or solid-state switches in order to ensure proper polarity connection between two sources of power. One exemplary application for such use is in the automotive field for the purpose of interconnecting rechargeable batteries. It is not uncommon for vehicles having rechargeable batteries, such as automobiles, busses, trucks, etc. and even watercraft to require boosts on their batteries from external sources of DC power. For example, in emergency situations, it may be necessary to jump-start a vehicle by connecting one vehicle's "dead" battery to another vehicle's "live" battery. Jumper cables can be used for this purpose, but it is imperative to connect the batteries with proper polarity, i.e. positive to positive and negative to negative. Failure to do so can potentially cause serious damage to either or both vehicles' electrical systems.

In the past, a variety of techniques have been employed by others to ensure proper interconnection between vehicle batteries. For example, U.S. Pat. No. 4,400,658 to Yates, issued Aug. 23, 1983, relates to a battery cable jumper arrangement incorporating a plurality of solenoids and a switching arrangement. A pair of double pole, double throw (DPDT) switches are actuated by the solenoids to ensure correct polarity of connection between the power source and the battery, irrespective of the connected arrangement of the cable pairs. In U.S. Pat. No. 5,103,155 to Joannou, issued Apr. 7, 1992, a battery charging system utilizes solid-state components interconnected between two pairs of booster cables. Joannou's device incorporates an electronic polarity sensing, monitoring and alarm circuit and a polarity sensing relay.

SUMMARY OF INVENTION

It is an object of the present invention to provide an new and useful electromechanical switching device which is adapted for interconnection between a pair of power sources and operative to establish electrical communication between desired terminals of the power sources, such as between like terminals.

It is another object of the present invention to provide an electromechanical switching device which utilizes either electromagnetic or solenoid technology to ensure proper interconnection between two power sources.

A further object of the present invention is to provide a new and useful electromechanical switching device which is relatively easy and inexpensive to manufacture.

Yet another object of the present invention is to provide a new and useful methodology for ensuring automatic, desired electrical interconnection between two sources of power.

The present invention is particularly adapted to interconnect like terminals of a pair of power sources. To this end, the invention broadly includes a plurality of current-carrying coils each adapted to electrically connect in a selected connection state to the oppositely polarized terminals associated with the respective one of the power sources to produce an associated magnetic field so that a composite magnetic field is established for the plurality of coils. A switch is then magnetically coupled to the coils and is operative when the coils are connected to the power sources to interact with the composite magnetic field thereby to interconnect the like terminals of the power sources irrespective of the connection states of the coils.

In its basic forms, the invention provides an electromechanical switch device that is operative to electrically interconnect the positive terminal of the first power source to a selected one of the positive and negative terminals of the second power source and a negative terminal of the first power source of the other one of the positive and negative terminals of the second power source thereby to define a selected coupled state. This switching device includes a switch that has first, second and third pairs of contacts with the switch being movable between a first state wherein each of the third pair of contacts is place in electrical communication with respect to one of the first pair of contacts and a second state wherein each of the third pair of contacts is placed in electrical communication with respective to one of the second pair of contacts.

A first pair of electrical leads have first ends connected to the first pair of contacts and also to the second pair of contacts in a configuration such that the electrical communication between the third electrical contacts and the first pair of the leads is reversed when the switch moves from the first state to the second state. A second pair of electrical leads have first ends connected to the third contacts. Second ends of both the first and second ends of electrical leads are then adapted to connect respectively to the positive and negative terminals of the first and second power sources.

A switch controller is provided which includes a plurality of current-carrying coils which are in electrical communication with the first and second pairs of electrical leads and an actuator coupled to set switch. The current-carrying coils, when connected to the power sources produce a composite magnetic field with the coils being arranged such that the actuator interacts with the composite magnetic field to automatically move the switch into whichever one of the first and second states results in the interconnection of the first and second power sources in the selected couple state regardless of the respective connections in the second ends of the leads to the power sources.

Preferably, the switch is a double pole double throw switch, and the switch controller includes an inner coil interposed between a pair of outer coils. The inner and outer coils are movable with respect to one another as a result of the magnetic interaction when current flows through the coils. The actuator is then secured to one of the inner and outer coils for common movement therewith thereby to throw the switch. Preferably, the inner and outer coils are spiral wound and axially aligned so that the actuator may move in an axial direction internally of the coils. The actuator is preferably secured to the inner coil while the outer coils are fixed so that reciprocation of the inner coil reciprocates the actuator between first and second positions. The first and second coils are then wound in opposite directions relative to the common coil axis and are electrically interconnected so that, when current is passed therethrough, the first and second coils produce magnetic fields having a common polarity opposed to one another. The outer coils are, for convenience, are wound with a common piece of wire.

Accordingly, the present invention is also directed to a method of ensure proper electrical interconnection between a pair of power sources. The method includes these steps of producing a first magnetic field associated with a first one of the power sources, and producing a pair of second magnetic fields associate with a second one of the power sources. A switch is then actuated in response to interaction between the first and second magnetic fields thereby to establish electrical interconnection between like terminals of the power sources. This method accomplishes the step of producing the magnetic fields by interconnecting a first power source to a first current-carrying coil and the step of producing the second magnetic field is accomplished by connecting the second power source to a pair of second current-carrying coils in a manner such that the second magnetic fields are oriented oppositely with respect to one another.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is directed to an electromechanical switching device that automatically provides desired polarity connection between two sources of power. For example, in the vehicle industry, which includes automobiles, buses, etc. and in the watercraft industry, rechargeable batteries are used to start the vehicle's or boat's engine. Sometimes, it is necessary to utilize the battery of one vehicle or craft to boost-start the engine of another. The present invention provides a means for automatically assuring that correct polarity connections between the electrical systems of two vehicles or water crafts are made. Thus, the present invention is described with this application in mind; however, it should be understood that other applications requiring desired polarity interconnection could employ the technique described herein.

Figure 1:
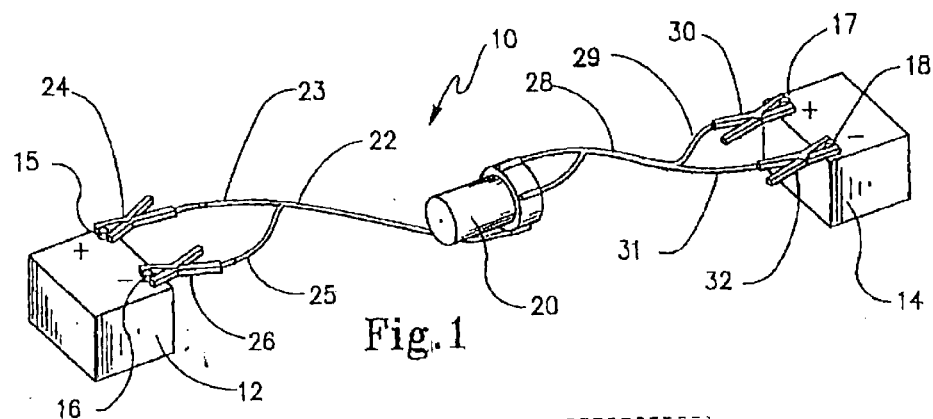
FIG. 1 is a perspective view of a charging system according to the present invention.
Figure 2:
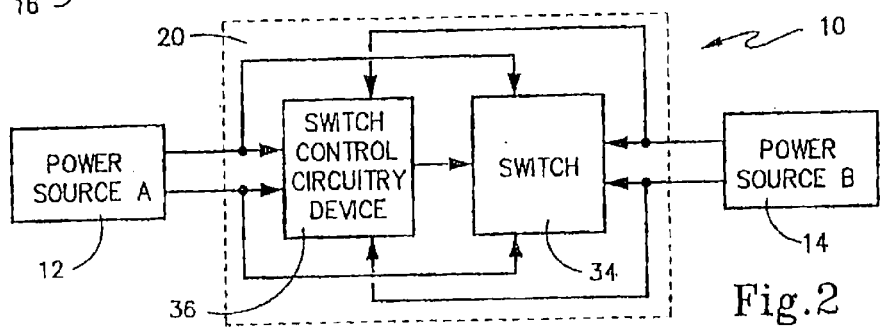
FIG. 2 is a diagrammatic view of the charging system shown in FIG. 1.
Figure 3:
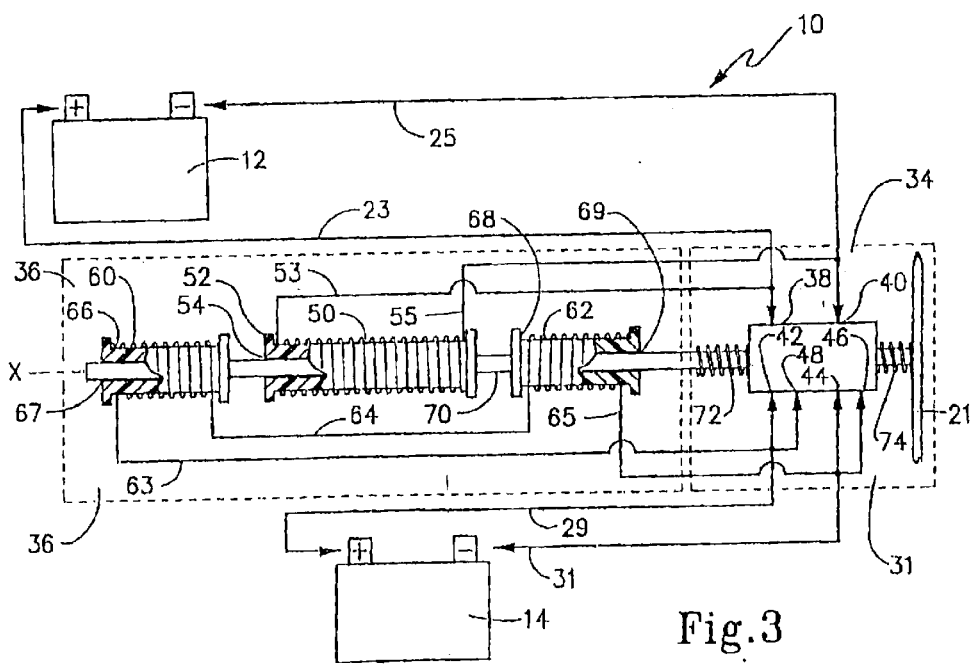
FIG. 3 is a circuit diagram showing the principal features of the charging system, and its associated electromechanical switching device, according to a first exemplary embodiment of the present invention.

With that in mind, a first exemplary embodiment of the present invention is shown in FIG. 1 wherein electromechanical switching device 10 is shown interconnecting two sources of power in the form of a first battery 14 and a second battery 12. Switching device 10 includes a housing 20 and first and second electrical cables 28 and 22. Each of cables 28 and 22 are formed by a pair of electrical leads. Thus, it may be seen that first cable 28 includes a lead 29 that terminates in an alligator clamp 30 that is connected to the positive terminal 17 of first battery 14. Lead 31 of cable 28 also terminates in an alligator connector 32 that is connected to negative terminal 18 of first battery 14. Cable 22 likewise has a pair of leads 23 and 25. Lead 23 terminates in an alligator connector 24 that is connected to the positive terminal 15 of second battery 12. Similarly, lead 25 terminates in an alligator clamp 26 that is releasably connected to negative terminal 16 of battery 12. Housing 20 contains electromechanical switching circuitry that ensures proper interconnection of the two power sources and, to this end, electrical leads 23, 25, 29 and 31 are electrically connected to this circuitry at ends opposite the respective alligator clamps. With reference to FIG. 2, it may be seen that housing 20 includes a switch 34 and a switch control device 36 which determines the condition of switch 34. Switch 34 is preferably a double-pole double-throw (DPDT) switch which has its center contacts 38 and 40 connected to the positive and negative terminals of Power Source "A" (in the form of battery 12). A first set of throw contacts 42 and 44 of switch 34 are connected respectively to the positive and negative terminals of Power Source "B" (in the form of battery 12) while a second set of throw contacts 46 and 48 are cross-connected to first ends of leads 29 and 31. This reverses the electrical communication between the third contacts and the electrical leads 29 and 31 which the switch is moved between switching states. Switch control device 36 is provided to control which pair of throw contacts 42, 44 or 46, 48 are placed respectively in contact with the third set of contacts, designated as center contacts 38 and 40 to define a first and second state for switch 34. That is, a switch control device 36 determines movement or the "throw" of switch 34 and accomplishes it in a manner that automatically puts the desired polarity in a connection between the two power sources. This condition may be referred to as the "coupled state" for the two power sources.

Where electromechanical device 10 is employed as a jumper cable for vehicle or watercraft use, it is desired that the two power sources, such as batteries 12 and 14 be interconnected so that like polarities are in electrical communication to one another. Accordingly, for sake of explanation, a first exemplary embodiment of the present invention is shown in FIG. 3 for connection to two power sources in the form of batteries 12 and 14 so that like polarities are interconnected as the coupled state. In FIG. 3, it may be seen that switch control device 36 is in the form of a plurality of current carrying coils which each produce associated magnetic fields so that the array of coils establishes a composite magnetic field that controls a position of an actuator for switch 34.

In the first exemplary embodiment, a center coil 50 is wound counterclockwise and is in electrical communication with leads 23 and 25 respectively by way of leads 53 and 55. Center coil 50 is interposed in spaced relation between a pair of outer coils 60 and 62 with first outer coil 60 being wound counterclockwise and second outer coil 62 being wound clockwise. Coils 60 and 62 are electrically interconnected to one another by electrical lead 64 and may preferably be wound from a common strand of wire. Coils 60 and 62 are in turn interconnected to leads 29 and 31, respectively, by leads 63 and 65. As noted above, leads 23 and 25 have first ends that are connected, respectively, to contacts 38 and 40 of switch 34. Lead 63 is connected to contacts 42 and 48 of switch 34, and lead 65 is connected to contacts 44 and 46 of switch 34.

Preferably, coils 50, 60 and 62 are formed by spools which have hollow cores and about which a spiral winding of wire is supported. For example, center or inner coil 50 includes a spool 52 having a longitudinally extending central bore 54 therethrough. Outer coil 60 includes a spool 6G having a longitudinally extending bore 67 extending therethrough while coil 62 includes a spool 68 having a longitudinally extending bore 69 extending therethrough. Coils 50, 60 and 62 are preferably longitudinally aligned with one another along a common coil axis "X" so that bores 54, 67 and 69 are aligned with one another.

Switch 34 includes an actuator 70 that extends through bores 54, 67 and 69. In the first exemplary embodiment, actuator 70 is secured to spool 52 so that movement of coil 50 to the left or right as shown in FIG. 3 causes actuator 70 to move to the left or right respectively. Coils 60 and 62 are fixed with respect to the housing 20, in any convenient manner, and actuator 70 is spring biased by means of centering springs 72 and 74 acting, for example, against sidewall 21 of housing 20 so as to maintain actuator 70 in a neutral position wherein there is no electrical communication between contacts 38, 40 and any of contacts 42, 44, 46 and 48. Electrical communication only occurs when a connection is made to the power sources.

Figure 4A:
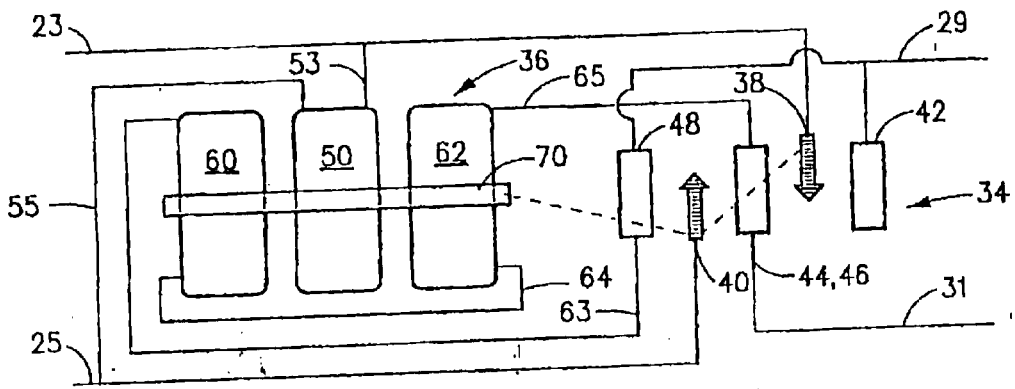
FIGS. 4(a) through 4(e) are diagrammatic views illustrating the operation of the electromechanical switching device of FIG. 3 in response to various connected states of the two power sources.

This neutral position is diagramed in FIG. 4(a). Here, it may be seen that center coil 50 is equidistantly positioned between outer coils 60 and 62 such that actuator 70 is in a neutral position. When actuator 70 is in the neutral position, it may be seen that the poles associated with pole contacts 38 and 40 do not make electrical communication with any of contacts 42, 44, 46 or 48. Electromechanical switch device 10 is thus in a neutral state prior to interconnection with a power source.

Figure 4B:
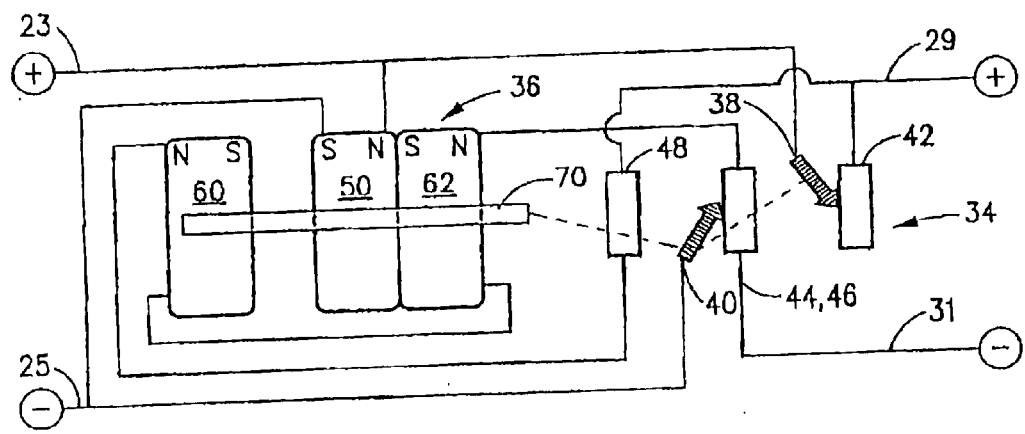

However, with reference to FIGS. 4(b)–4(e), it may be seen that, when electromechanical switching device 10 is connected between two power sources, it automatically operates to establish electrical communication between like terminals of the power sources. Thus, for example, in FIG. 4(a), the connection of leads 23 and 25 to the positive and negative terminals of a power source creates a circuit through center coil 50 so that it has a north and south magnetic poles, with these poles being respectively designated as "N" and "S". Correspondingly, contact 40 is negatively biased while contact 42 is positively biased. When leads 29 and 31 are respectively connected to the positive and negative terminals of a second power source an electrical circuit is established between outer coils 60 and 62 which generate associated magnetic poles. Here, due to their opposite winding, coils 60 and 62 have south poles opposed to or facing one another and north poles outwardly opposite one another. As a result, coil 50 is repelled from coil 60 and attracted to coil 62. Coil 50 thus moves to the right as is shown in FIG. 4(b), and actuator 70 toggles switch 34 so that contact 40 is placed in electrical communication with contacts 44 and 46 while contact 38 is placed in electrical communication with contact 42. Thus, the positive terminals of the two power sources are in electrical communication with one another and the negative terminals of the two power sources are in electrical communication with one another. Correspondingly, contact 42 is positive while contacts 44, 46 are negatively biased.

Figure 4C:
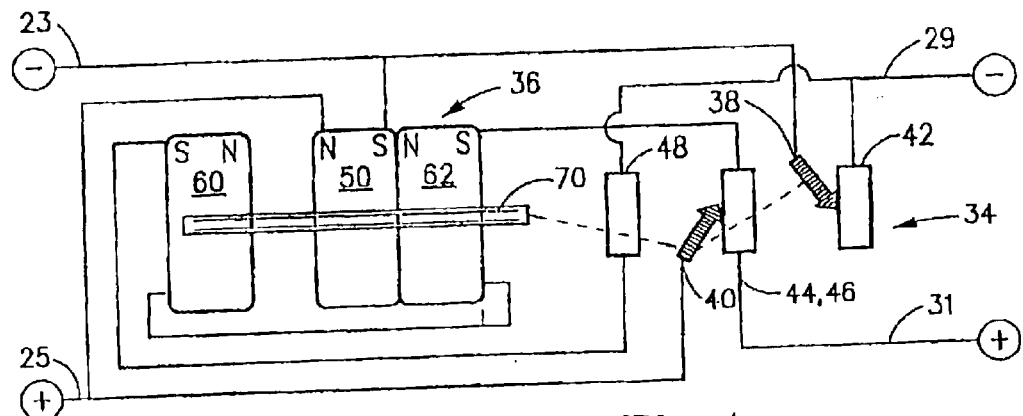

If the connection to each of the power sources is reversed, as is shown in FIG. 4(c), a similar circuit configuration results. Here, leads 23 and 25 are respectively connected to the negative and positive terminals of the first power source while leads 29 and 31 are respectively connected to the negative and positive terminals of the second power source. This reverses the magnetic poles for each of coils 50, 60 and 62. However, due to this reversal, coil 50 still shifts to the right by being attracted to coil 62 and being repelled from coil 60. Actuator 70 again moves to the right placing electrical contact 38 in communication with electrical contact 42 and electrical contact 40 in communication with contacts 44 and 46. However, since the electrical bias of each of the contacts is reversed, once again the positive terminals of the two power sources are in communication as are the negative terminals.

Figure 4D:
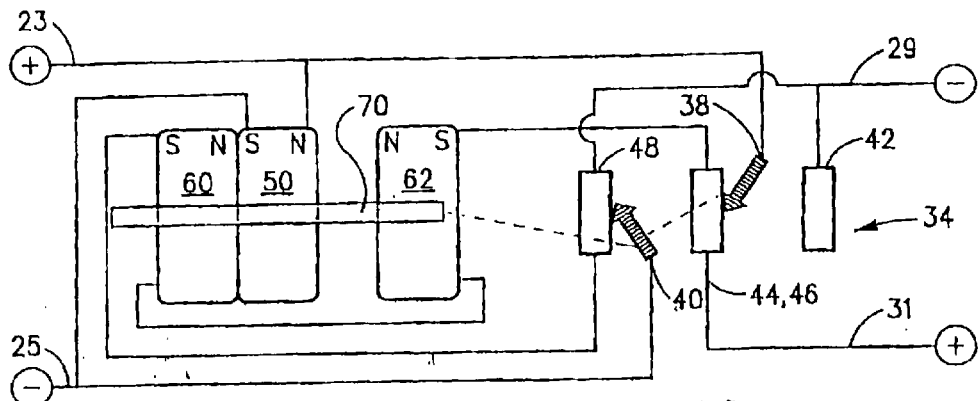

With reference to FIG. 4(d), the electrical connection to the first power source by leads 23 and 25 are the same as that shown in FIG. 4(b). Here, however, the electrical connection of leads 29 and 31 are reversed so that lead 29 is connected to the negative terminal of the second power source and lead 31 is connected to the positive terminal. When so connected, coil 50 has its magnetic polarity the same as that shown in FIG. 4(d). However, each of coils 60 and 62 are reversed so that now the north poles face one another with the south poles opposite one another. Accordingly, coil 50 will be attracted to coil 60 and repelled by coil 62. Coil 50 and actuator 70 thus move to the left as is shown in FIG. 4(d). This places electrical contact 38 in communication with contacts 44, 46 and electrical contact 40 in communication with electrical contact 48. Since electrical contacts 44 and 46 are positively biased, and since electrical contact 48 is negatively biased, with respect to the second power source, the positive polarities of each of the power sources are again in communication as are the negative terminals.

Figure 4E:
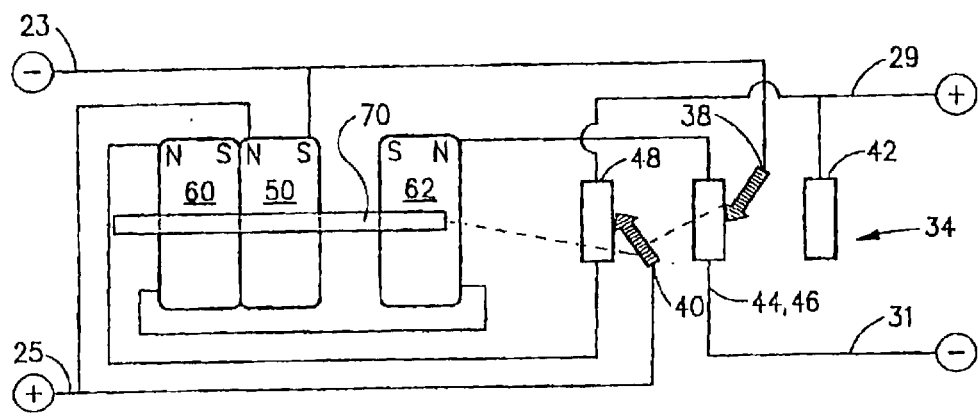

Finally, in FIG. 4(e), the electrical connection of leads 29 and 31 to the second power source are the same as shown in FIG. 4(b). Here, however, the electrical connection of leads 23 and 25 are reversed with respect to the first power source with lead 23 being connected to the negative terminal and lead 25 being connected to the positive terminal. Accordingly, in comparison with FIG. 4(b), the magnetic polarity of coil 60 and 62 remains the same while the magnetic polarity of coil 50 is reversed. In this configuration, coil 50 is attracted to coil 60 and repelled by coil 62, thus causing it and actuator 70 to move to the left. Again, contact 38 is placed in electrical communication with contacts 44, 46 while contact 40 is electrically in communication with contact 48. Since leads 23 and 25 are reversed, however, contact 38 is negatively biased and contact 40 is positively biased with respect to the second power source. Accordingly, matching polarity is again achieved.

Figure 5:
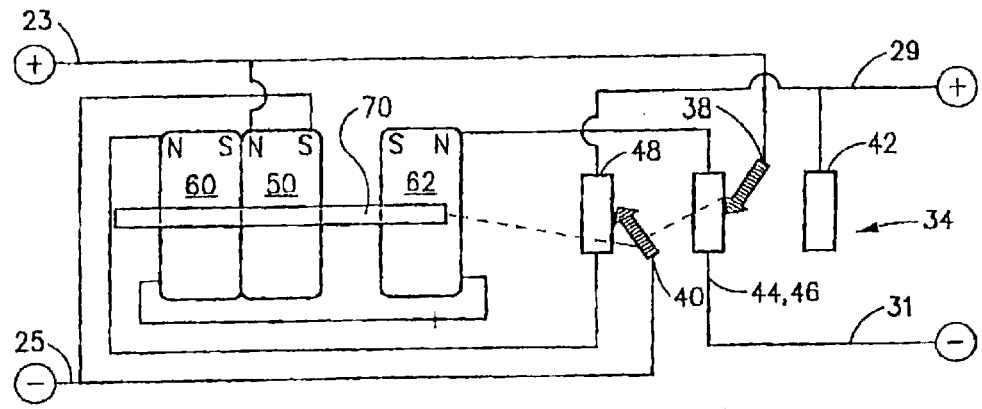
FIG. 5 is a diagrammatic view illustrating the operation of an electromechanical switching device according to a second embodiment of the present invention.

While the present invention has been described with respect to an electromechanical switching device that is operative to automatically ensure that like terminals of two power sources are placed in communication, such as would be desirable for an automobile "jumper cable", the ordinarily skilled person in this field would recognize that the exemplary embodiments shown in FIGS. 1–4 could be modified to ensure that opposite polarity terminals of two power sources are automatically placed in communication. Thus, with reference to FIG. 5, it may be seen that merely the reversing of the winding of coil 50 is all that is required to accomplish this task. FIG. 5 may readily be compared to FIG. 4(b) to determine that an opposite result occurs by this reverse winding of coil 50. Here, when leads 23 and 25 are respectively connected to the positive and negative terminals of a first power source, the magnetic polarity of coil 50 is reversed so that its north pole is located on the left side and the south pole is located on the right side. When leads 29 and 31 are connected, a polarity of coil 60 and 62 are the same as that shown in FIG. 4(b). As a result of reversing the polarity of coil 50, though, coil 50 is attracted to coil 60 and repelled by coil 62. Thus, coil 50 and actuator 70 move to the left. This toggles switch 34 so that contact 38 is placed in electrical communication with contacts 44 and 46 while contact 40 is placed in communication with contact 48. Thus, in a positive terminal of the first power source is connected to the negative terminal of the second power source and the negative terminal of the first power source is connected to the positive terminal of the second power source. A similar result of connecting opposite polarities would occur for the other possible connection states, as well.

Moreover, it should be appreciated that, in the embodiment shown in FIGS. 1–5, coils 60 and 62 are held stationary, while coil 50 and actuator 70 translate between coils 60 and 62. It should be understood, though, that coil 50 could be stationary and the structure provided so that coils 60 and 62 translate along with the actuator 70. Also, as described below, it is possible that all three coils 50, 60 and 62 be held stationary while translating only the actuator 70.

Figure 6:
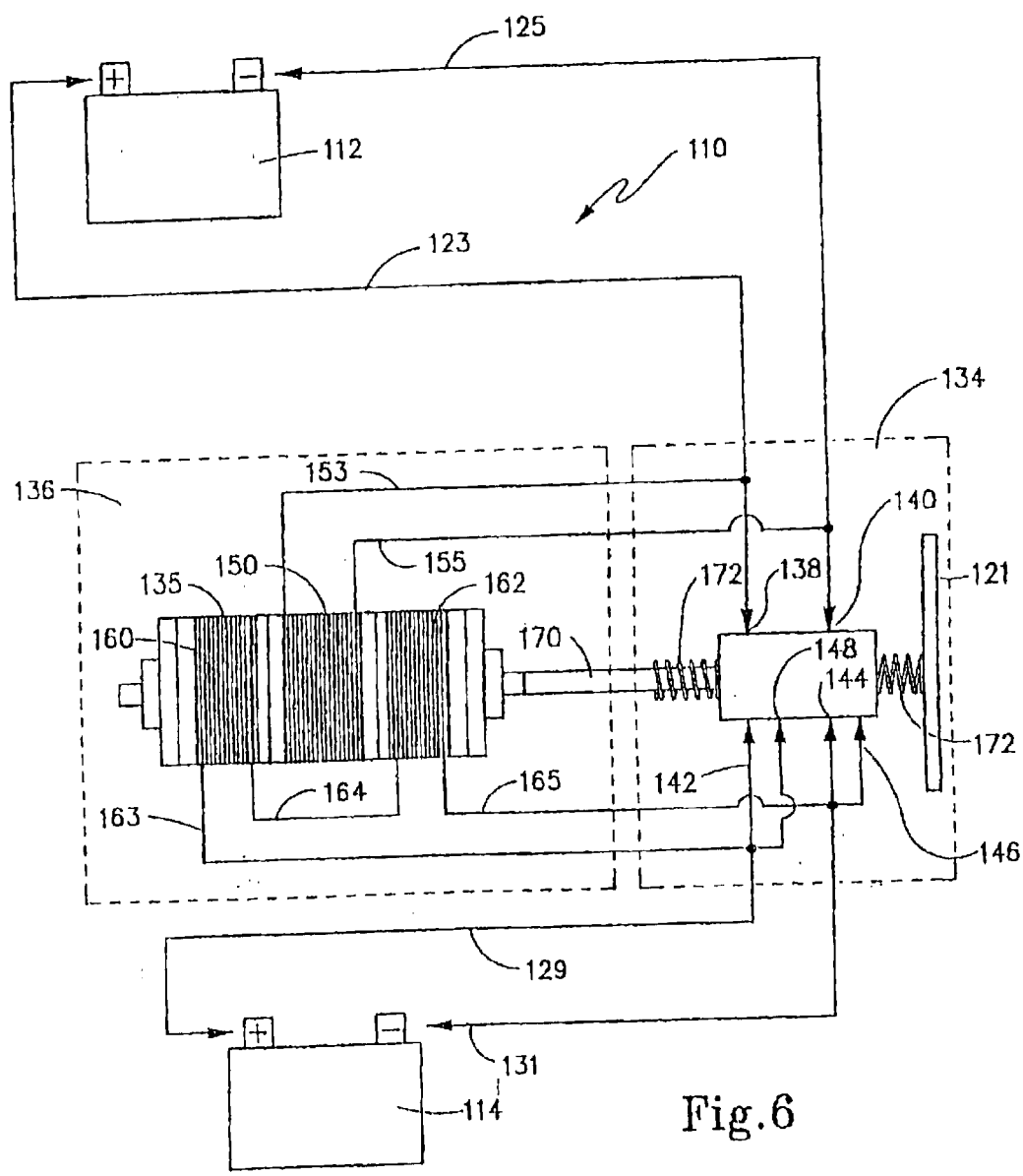
FIG. 6 is a circuit diagram showing the principal features of the charging system, and its associated electromechanical switching device, according to a third exemplary embodiment of the present invention.
Figure 7:
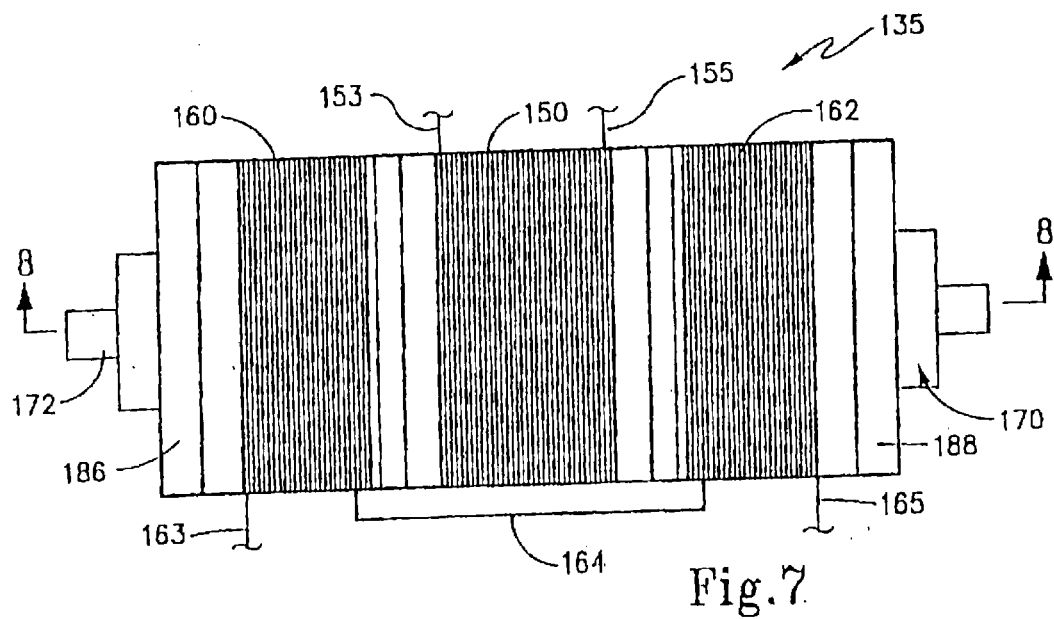
FIG. 7 is a side view in elevation of the solenoid component for the electromechanical switching device depicted in FIG. 6.
Figure 8:
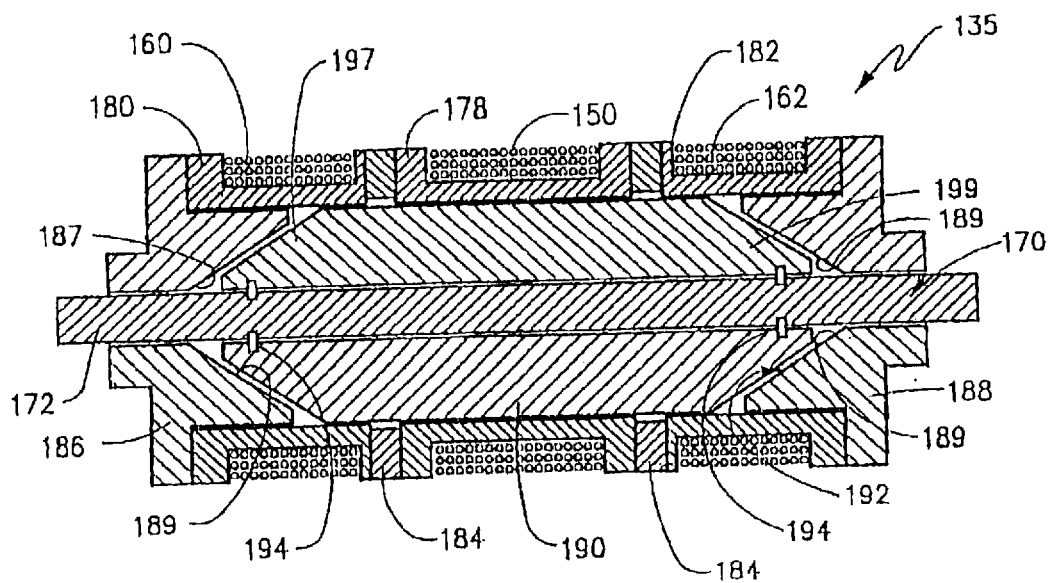
FIG. 8 is a cross-sectional view of the solenoid as viewed about lines 8—8 in FIG. 7.

A third alternate embodiment of the present invention is shown in FIGS. 6–8 where an electromechanical switching device 110 employs a solenoid 135 as switch control device 136. Here again, electromechanical switching device 110 includes a pair of leads 123, 125 which are adapted to interconnect to a power source such as battery 112. Another pair of leads 129 and 131 are likewise provided to connect to an associated power source such as battery 114. Leads 123, 125 connect to a central winding 150 of solenoid 135 by means of leads 153 and 155. Leads 123 and 125 are also connected to contacts 138 and 140 respective of switch 134. Lead 129 is connected by lead 163 to a first outer winding 160 of solenoid 135, and outer winding 160 is connected to a second outer winding 162 of solenoid 135 by means of a lead 164. Electrical connection is then made by lead 131 to coil 162 by way of lead 165. Lead 129 also establishes electrical communication to contacts 142 and 148 of switch 134 while lead 131 is in electrical communication with contacts 144 and 146 of switch 134. Centering springs 172 and 174 maintain actuator 170 in a neutral position, for example, against sidewall 121 of the housing for electromechanical switch 110.

Thus, it should be appreciated that the structure of the third exemplary embodiment shown in FIG. 6 is identical with respect to the embodiment shown in FIGS. 1–4 except that a single solenoid 135 having multiple windings replaces coils 50, 60 and 62. Here, also, it should be appreciated that actuator 170 includes as a portion thereof a magnetic permeable material such that actuator 170 translates axially within solenoid 135. Thus, solenoid 135 remains stationary within the housing while actuator 170 interacts with switch 134 to change to the electrical state thereof.

The structure of solenoid 135 may best be seen in reference to FIGS. 7 and 8. Solenoid 135 is preferably about 2.5–3.0 inches (6.3–7.6 cm) long and 1.0–1.25 inches (2.5–3.2 cm) in diameter. Here, it may be seen that coil 150 is wound on an insulated spool 178 while coils 160 and 162 are respectively wound on insulating spools 180 and 182. spools 178, 180 and 182 are preferably formed of an insulating material, such as plastic. Spool 178 is separated from each of spools 180 and 182 by means of a spacer or washer 184 preferably formed of a magnetic permeable material such as soft iron. A pair of end caps 186 and 186 enclose opposite ends of solenoid 135 with the end caps formed of a magnetic permeable material, again such as soft iron. With this construction, end caps 186 and 188 get polarized, respectively, by coils 160 and 162. End caps 186 and 188 have inwardly facing conic surfaces 187 and 189.

Actuator 170 includes an elongated rod 172 which extends axially through solenoid 135 and is in the form of a cylindrical rod made from metallic material, such as stainless steel. A core 190 is positioned centrally in cavity 192 formed between end caps 186, 188 and spools 178, 180 and 182. Core 190 is formed of a magnetic permeable material, such as soft iron that reacts to the magnetic fields generated by solenoid 135, and has opposite frastoconical ends 197 and 199 configured similarly to surfaces 187 and 189. Rod 172 is secured to core 190 by means of suitable clips 194 so that rod 172 and core 190 translate together as a single unit.

From this description, it should be appreciated that coils 150, 160 and 162 perform a similar function as coils 50, 60 and 62. Here, however, the shifting of actuator 170 to the left or right occurs as a result of the interaction of the magnetic permeability of core 190. Actuator 170 thus actuates switch 134 similarly to that described with respect to switch 34.

From the foregoing, it should be appreciated that the present invention also includes a method having shown desired electrical interconnection automatically between a pair of power sources where each of the power sources includes a positive terminal and a negative terminal. This method is accomplished by the structure described above, but broadly includes the first step of producing a first magnetic field associated with a first one of the power sources and producing a pair of second magnetic fields associated with a second one of the power sources. Finally, the broad method includes actuating a switch in response interaction between the first magnetic field and the second magnet fields thereby to establish electrical interconnection between the desired terminals of the power sources.

This method preferably includes the step of actuating the switch so as to establish electrical interconnection between the like terminals of the power sources. The step of producing the first and second magnetic fields is accomplished by electrically interconnecting the positive terminal and negative terminal associated with a first one of the power sources to a first current-carrying coil and electrical interconnecting the oppositely polarized terminals associated with a separate one of the power sources to a pair second current-carrying coils in a manner such that the second magnetic fields are oriented oppositely with respect to one another. The method then includes interposing the first current-carrying coil between the second current-carrying coils in spaced relation and actuating the switch in response to relative movement between the first and second coils.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiments of the present invention without departing from the inventive concepts contained herein.

I claim:

1. An electromechanical switching device operative to electrically interconnect a positive terminal of a first power source to a selected one of a positive and negative terminal of a second power source and a negative terminal of said first power source to another one of the positive and negative terminals of said second power source thereby to define a selected coupled state for the first and second power sources, comprising:

(a) a switch including a first pair of contacts, a second pair of contacts and a third pair of contacts, said switch movable between a first state wherein each of said third pair of contacts is placed in electrical communication with a respective one of said first pair of contacts and a second state wherein each of said third pair of contacts is placed in electrical communication with a respective one of said second pair of contacts;

(b) a first pair of electrical leads having first ends each respectively connected to a selected one of said first pair of contacts and to a selected one of said second pair of contacts in a configuration such that electrical communication between each of said third electrical contacts and said first pair of electrical leads is reversed when said switch moves from said first state to said second state, said first pair of electrical leads having second ends adapted to connect respectively to the positive and negative terminals of one of said first and second power sources;

(c) a second pair of electrical leads having first ends each respectively connected to a selected one of said third contacts and second ends adapted to connect respectively to the positive and negative terminals of another of said first and second power sources; and (d) a switch controller including a plurality of current-carrying coils in electrical communication with said first and second pairs of electrical leads and an actuator coupled to said switch, said current carrying coils operative upon connection of the second ends of said first and second pairs of leads to said first and second power sources to produce a composite magnetic field, said coils arranged such that said actuator interacts with said composite magnetic field to automatically move said switch into whichever one of said first and second states that interconnects said first and second power sources in the selected coupled state regardless of the respective connections of the second ends of said first and second pairs of leads to the positive and negative terminals of said first and second power sources.

2. An electromechanical switching device according to claim 1 wherein said switch is a double pole double throw switch.

3. An electromechanical switching device according to claim 1 wherein said switch controller includes an inner coil interposed between a pair of outer coils, said inner and outer coils movable with respect to one another as a result of magnetic interaction therebetween when current flows therethrough, said actuator secured to one of the inner and outer coils for common movement therewith.

4. An electromechanical switching device according to claim 1 wherein said switch controller includes an inner coil interposed and movable between fixed first and second outer coils, said actuator secured to said inner coil for common movement therewith.

5. An electromechanical switching device according to claim 4 wherein said first and second coils are spiral wound in opposite directions with respect to a common coil axis and are electrically interconnected so that, when current is passed therethrough, said first and second coils respectively produce magnetic fields having a common polarity opposed to one another.

6. An electromechanical switching device adapted for use with a pair of power sources each including a positive terminal and a negative terminal, said electromechanical switching device operative to establish electrical communication between like terminals of the power sources, comprising:

(a) a plurality of current-carrying coils each adapted to electrically connect in a selected connection state to the oppositely polarized terminals associated with a respective one of said power sources to produce an associated magnetic field so that a composite magnetic field is established; and (b) a switch magnetically coupled to said coils and operative when said coils are connected to the power sources to interact with the composite magnetic field thereby to interconnect the like terminals of the power sources irrespective of the selected connection state of said coils.

7. An electromechanical switching device according to claim 6 wherein said switch includes an actuator and a plurality of switch contacts.

8. An electromechanical switching device according to claim 7 wherein said coils are aligned along a longitudinally extending coil axis, said actuator extending through said coils along the coil axis and operative to move longitudinally therealong when said switch interacts with the composite magnetic field.

9. An electromechanical switching device according to claim 6 wherein said electromechanical switching device consists of three said coils.

10. An electromechanical switching device according to claim 9 wherein said coils are positioned about and are aligned along a longitudinally extending coil axis.

11. An electromechanical switching device according to claim 10 including a pair of longitudinally spaced apart outer coils and an inner coil interposed therebetween in spaced relation from each of said outer coils.

12. An electromechanical switching device according to claim 11 wherein each of said coils includes a spool and a spiral winding of wire supported thereon.

13. An electromechanical switching device according to claim 11 wherein said outer coils are wound in opposite directions.

14. An electromechanical switching device according to claim 11 wherein said outer coils are wound with a common piece of wire.

15. A method of ensuring desired electrical interconnection automatically between a pair of power sources, wherein each of said power sources includes a positive terminal and a negative terminal, comprising the steps of:

(a) producing a first magnetic field associated with a first one of said power sources;

(b) producing a pair of second magnetic fields associated with a second one of said power sources; and (c) actuating a switch in response to interaction between said first magnetic field and second magnetic fields thereby to establish electrical interconnection between the desired terminals of said power sources.

16. The method according to claim 15 wherein the step of producing said first magnetic field is accomplished by electrically interconnecting the positive terminal and the negative terminal associated with a first one of said power sources to a first current-carrying coil, and wherein the step of producing said second magnetic fields is accomplished by electrically interconnecting the oppositely polarized terminals associated with a second one of said power sources to a pair of second current-carrying coils in a manner such that the second magnetic fields are oriented oppositely with respect to one another.

* * * * *